US006369798B1

(12) United States Patent
Yatsu et al.

(10) Patent No.: US 6,369,798 B1
(45) Date of Patent: Apr. 9, 2002

(54) DATA PROCESSING EQUIPMENT WITH DETACHABLE POINTING DEVICE

(75) Inventors: Nobuo Yatsu; Norio Endo, both of Tokyo (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 0 days.

(21) Appl. No.: 09/199,272

(22) Filed: Nov. 25, 1998

(30) Foreign Application Priority Data

Nov. 28, 1997 (JP) .............................. 9-328132

(51) Int. Cl.⁷ ................................................ G09G 5/08
(52) U.S. Cl. ....................... 345/167; 345/158; 345/168
(58) Field of Search ................................ 345/156, 157, 345/158, 163–167, 168, 169

(56) References Cited

U.S. PATENT DOCUMENTS

| | | | | |
|---|---|---|---|---|
| 5,049,863 A | * | 9/1991 | Oka | 340/10 |
| 5,231,380 A | * | 7/1993 | Logan | 340/706 |
| 5,473,344 A | * | 12/1995 | Bacon | 345/163 |
| 5,790,100 A | * | 8/1998 | Kikinis | 345/158 |
| 5,793,355 A | * | 8/1998 | Youens | 345/157 |
| 5,864,334 A | * | 1/1999 | Sellers | 345/168 |
| 5,886,686 A | * | 3/1999 | Chen | 345/168 |
| 5,958,023 A | * | 9/1999 | Klein | 710/18 |
| 6,031,518 A | * | 2/2000 | Adams et al. | 345/156 |

FOREIGN PATENT DOCUMENTS

| | | |
|---|---|---|
| JP | 4-152417 | 5/1992 |
| JP | 9-244805 | 9/1997 |

* cited by examiner

*Primary Examiner*—Richard Huerpe
*Assistant Examiner*—Kimnhung Nguyen
(74) *Attorney, Agent, or Firm*—Staas & Halsey LLP

(57) ABSTRACT

A data processing equipment including a housing for a keyboard and a display, and a pointing device detachably mounted in the housing for instructing the processing equipment on coordinate data by manually entering analog information. The pointing device includes a casing, an analog information entering section arranged in the casing and capable of being operated by two modes of different entering operations, a processing section arranged in the casing in association with the analog information entering section to convert analog information into digital coordinate data, and a light emitting section arranged in the casing in association with the processing section to emit light signals representing the digital coordinate data. The housing includes a first light receiving section for receiving the light signals emitted from the light emitting section when the pointing device is attached to the housing for operation, and a second light receiving section for receiving the light signals emitted from the light emitting section when the pointing device is detached from the housing for operation.

20 Claims, 17 Drawing Sheets

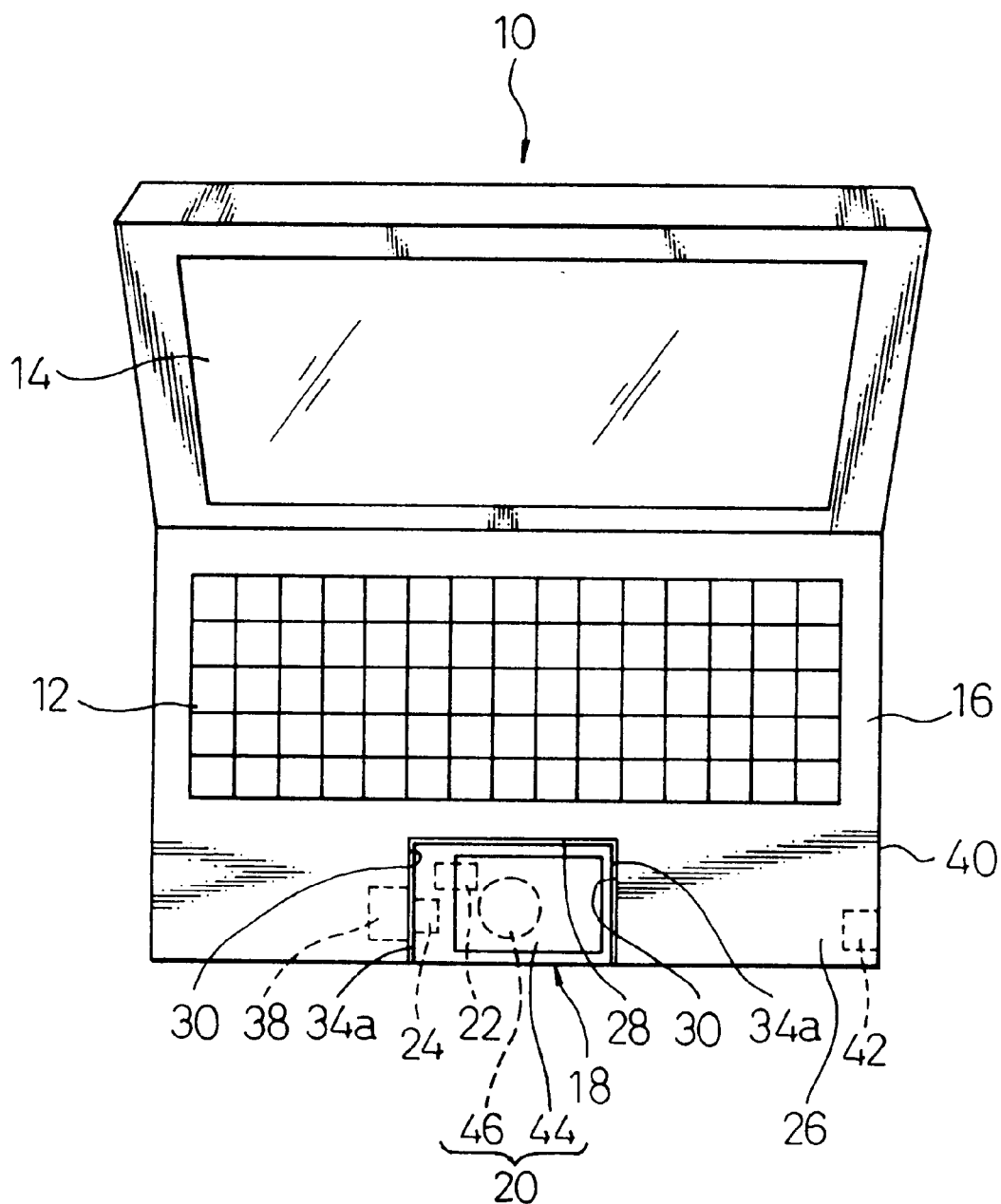

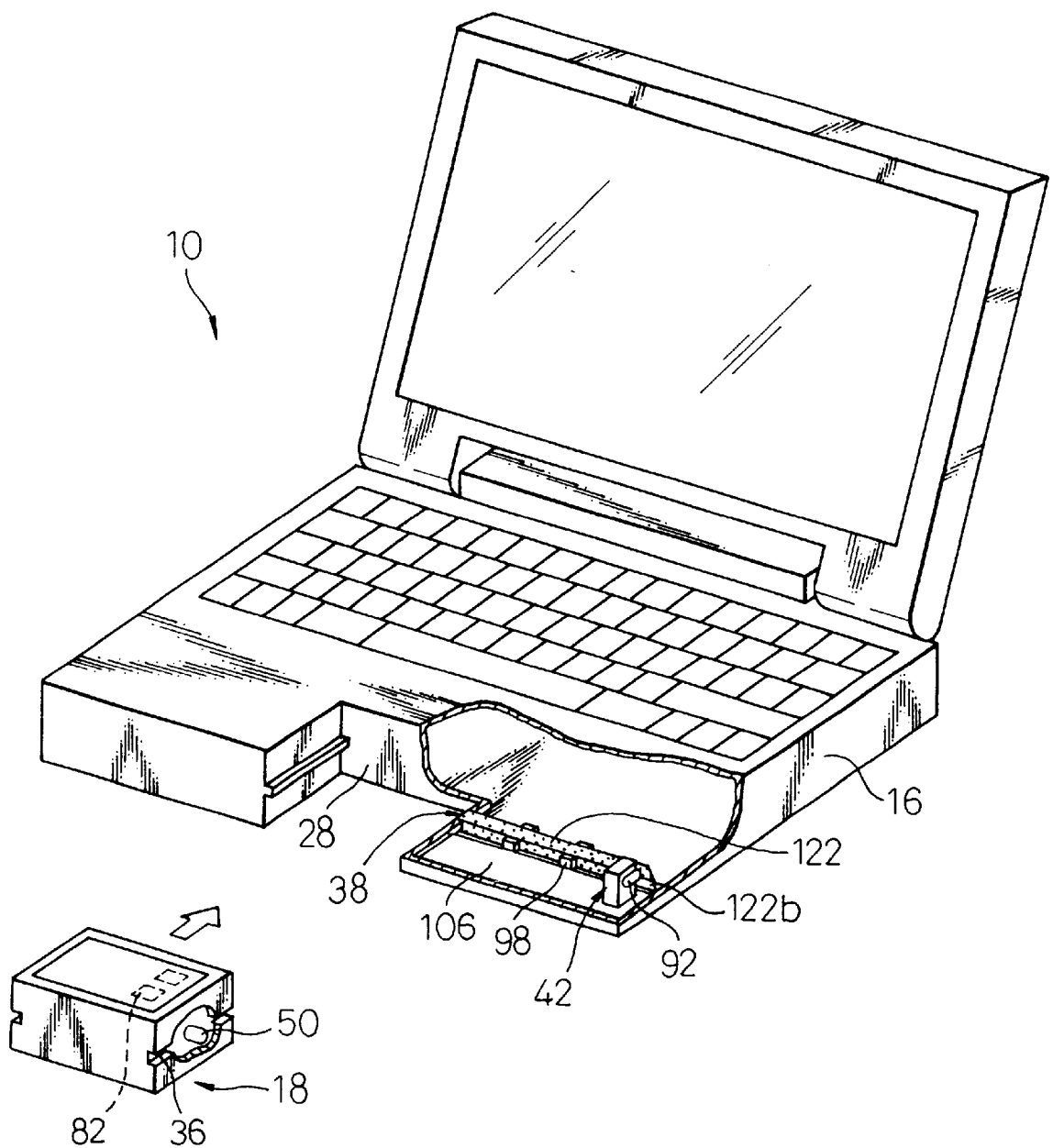

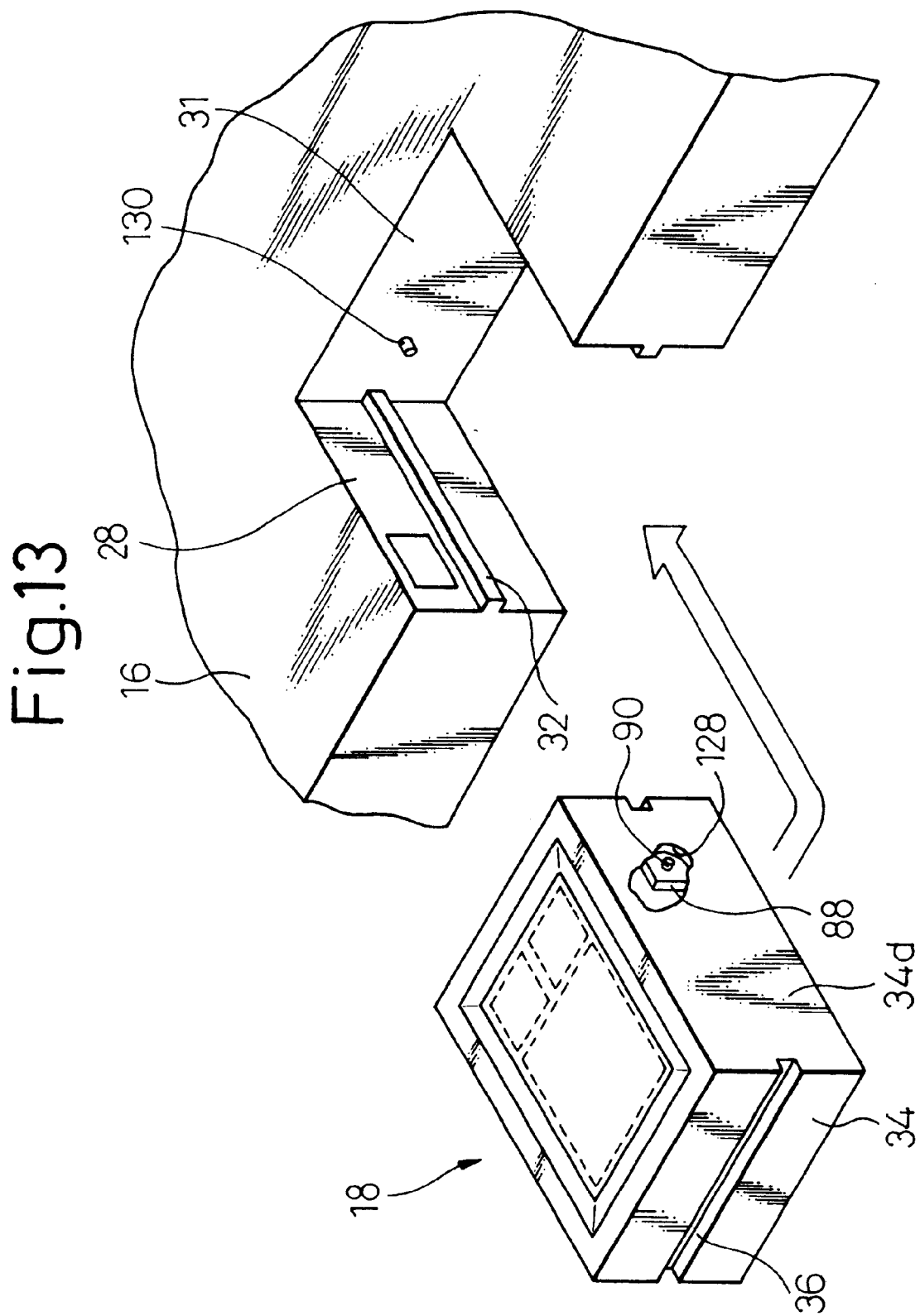

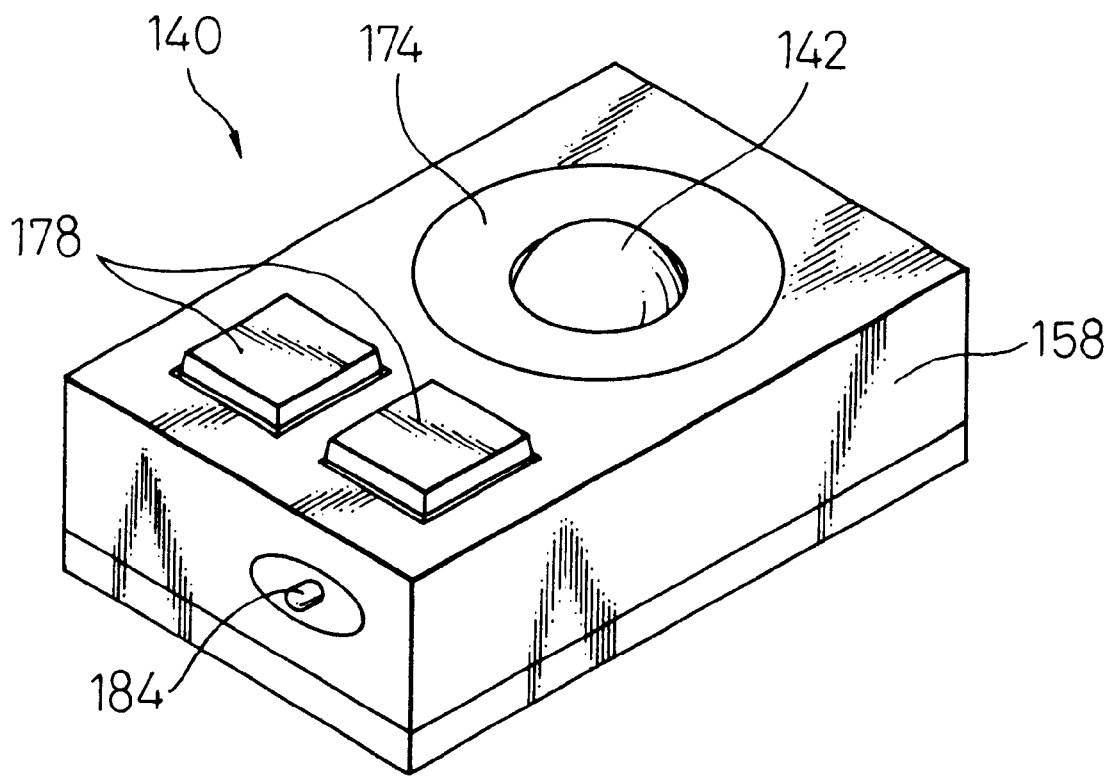

DATA PROCESSING EQUIPMENT WITH DETACHABLE POINTING DEVICE

BACKGROUND OF THE INVENTION

1. Field of the Invention

The present invention relates generally to a data processing equipment and, more particularly, to a data processing equipment, such as a personal computer, provided with a detachable pointing device used for instructing the processing equipment on the coordinate data on a display by manually entering analog information. The present invention also relates to a detachable pointing device provided with a radio transmission mechanism for digital coordinate data.

2. Description of the Related Art

A digital data processing equipment, such as a personal computer or a word processor, provided with a display, a keyboard and a pointing device as a coordinate data input device is well known in the art. The pointing device is adapted to be manually operated by an operator for entering analog information to instruct the processing equipment on the coordinate data on the display. Particularly, in a small or notebook-size, portable data processing equipment, a built-in type pointing device which is integrally incorporated in a housing of the processing equipment, or a separate type pointing device, generally referred to as a mouse, which is connected to the housing through a cable, is normally used.

Conventionally, the built-in type pointing devices integrally incorporated in the equipment housing are divided into the following three types, the typical entering operations of which are different from each other. One type is a ball-operation pointing device wherein a ball is incorporated in the housing on the top face thereof and an operator rotates the ball by a finger to enter the direction and angle of the rotation of the ball. Another type is a sheet-operation pointing device wherein a sheet or pad is incorporated in the housing on the top face thereof and an operator touches and slides a finger on the sheet to enter the direction and distance of the sliding operation of the finger. A further type is a stick-operation pointing device wherein a stick is incorporated in the housing to project upward from the top face thereof and an operator laterally pushes the stick to enter the direction and magnitude of the pushing force of the finger.

These built-in type pointing devices advantageously do not deteriorate the portability of the notebook-size data processing equipment, but have a problem in that the operability thereof is somewhat inferior to that of the mouse because the entering operations are required to be carried out in a limited area. On the other hand, the separate type pointing device or mouse which is used in a connected state with the equipment housing may deteriorate the portability of the notebook-size data processing equipment. To solve these drawbacks, a detachable pointing device is provided, which is detachably mounted to the housing of the notebook-size data processing equipment, as disclosed, e.g., in Japanese Unexamined Patent Publication (Kokai) No. 9-244805.

In a computer with built-in mouse, disclosed in JP-A-9-244805, the mouse is detachably accommodated in a receptacle space provided near a keyboard in such a condition that the bottom face of the mouse is upturned.

When the mouse is accommodated in the receptacle space, the operator directly can operate to rotate a ball provided on the bottom face of the mouse and exposed on the top surface of a keyboard by a finger, in the same manner as the built-in type ball-operation pointing device. When the mouse is detached from the receptacle space, the operator can operate the mouse in the same manner as the normal separate mouse. The detachable mouse is connected to a computer body through a cable.

In the computer with built-in mouse, disclosed in JP-A-9-244805, since the mouse is accommodated in the computer body in an upside-down condition as mentioned above, the operators finger shifting direction for ball-operation on a mouse attached state is different or reversed from the operator's hand shifting direction for ball-operation on a mouse detached state, when the same coordinate data on a display should be instructed, and thereby, it is difficult to smoothly operate the mouse to correctly instruct on the coordinate data. Therefore, this computer is provided with a matching circuit and a switch to avoid such a signal reversing phenomenon. Also, click buttons for supplying a signal of an operation command to displayed information are provided on both the top and bottom surfaces of the mouse. Further, a cable winding mechanism is provided for handling a cable for connecting the mouse to the computer body, when the mouse is accommodated. Consequently, the conventional computer with built-in mouse has problems in that the structures of the mouse and the computer as well as the control systems thereof are complicated, which increases the production cost.

SUMMARY OF THE INVENTION

It is, therefore, an object of the present invention to provide a data processing equipment, with a detachable pointing device, which can effectively solve the above problems.

It is another object of the present invention to provide a data processing equipment with a detachable pointing device in which the detachable pointing device can be easily and smoothly operated by an operator and thus the coordinate data can be correctly entered and instructed, both when the pointing device is attached to an equipment housing and when it is detached therefrom.

It is further object of the present invention to provide a data processing equipment with a detachable pointing device, which can simplify the structures and control systems of both the processing equipment and the pointing device.

It is yet further object of the present invention to provide a detachable pointing device, for use in a data processing equipment, which can eliminate a troublesome cable handling.

In accordance with the present invention, there is provided a data processing equipment comprising a housing for a keyboard and a display and a pointing device detachably mounted in the housing for instructing the processing equipment on coordinate data by manually entering analog information; the pointing device including a light emitting section for emitting light signals representing the coordinate data; the housing including a first light receiving section for receiving the light signals emitted from the light emitting section when the pointing device is attached to the housing for operation, and a second light receiving section for receiving the light signals emitted from the light emitting section when the pointing device is detached from the housing for operation.

In a preferred aspect of the present invention, the data processing equipment further comprises an optical transmission line for transmitting the light signals received in one of the first and second light receiving sections to the other light receiving section.

In another preferred aspect of the present invention, the data processing equipment further comprises a guide member for guiding the pointing device to a proper position in the housing.

In a further preferred aspect of the present invention, the data processing equipment further comprises a fastening mechanism for fastening the pointing device to a proper position in the housing.

It is advantageous that the pointing device includes an analog information entering section which can be operated in two or more modes for different entering operations.

In this arrangement, the analog information entering section may include a sheet-operation entering section in which the shifting direction and distance of a pushed position on a sheet member are entered and a ball-operation entering section in which the rotational direction and angle of a ball are entered.

The sheet member may be arranged in a casing of the pointing device to be exposed on a first wall of the casing, and the ball may be arranged in the casing to be partially exposed on a second wall of the casing opposed to the first wall.

In this arrangement, the data processing equipment may further comprise a switching mechanism for switching functions of the analog information entering section so as to give the sheet-operation entering section priority in function when the pointing device is attached to the housing, and to give the ball-operation entering section priority in function when the pointing device is detached from the housing.

Alternatively, the analog information entering section may include a ball-operation entering section in which the rotational direction and angle of the ball are entered, the ball being arranged in a casing of the pointing device to be partially exposed on two opposed walls of the casing.

Further, the pointing device may include a processing section for converting analog information entered through the analog information entering section into digital coordinate data.

The present invention also provides a pointing device comprising a casing detachably mounted in a data processing equipment; an analog information entering section arranged in the casing and capable of being operated in two or more modes for different entering operations; a processing section arranged in the casing in association with the analog information entering section to convert analog information into digital coordinate data; and a light emitting section arranged in the casing in association with the processing section to emit light signals representing the digital coordinate data.

In the preferred aspect of the present invention, the analog information entering section includes a sheet-operation entering section in which the shifting direction and distance of a pushed position on a sheet member are entered, and a ball-operation entering section in which the rotational direction and angle of a ball are entered.

In this arrangement, the sheet member may be arranged in the casing to be exposed on a first wall of the casing, and the ball may be arranged in the casing to be partially exposed on a second wall of the casing opposed to the first wall.

The pointing device may further comprise a switching mechanism for switching functions of the analog information entering section so as to give the sheet-operation entering section priority in function when the casing is attached to the data processing equipment, and to give the ball-operation entering section priority in function when the casing is detached from the data processing equipment.

Alternatively, the analog information entering section may include a ball-operation entering section in which the rotational direction and angle of the ball are entered, the ball being arranged in the casing to be partially exposed on two opposed walls of the casing.

BRIEF DESCRIPTION OF THE DRAWINGS

The above and other objects, features and advantages of the present invention will become more apparent from the following description of preferred embodiments in connection with the accompanying drawings, in which:

FIG. 2 is a schematic plan view showing the data processing equipment of FIG. 1, with the detachable pointing device being attached to the housing;

FIG. 10 is a partially cut-out perspective view showing a modification of the optical transmission line of the data processing equipment of FIG. 1;

FIG. 13 is a partially enlarged perspective view showing a modification of the switching mechanism;

FIG. 15 is a perspective view showing a second embodiment of a detachable pointing device according to the present invention;

DETAILED DESCRIPTION OF THE PREFERRED EMBODIMENTS

Figure 1:
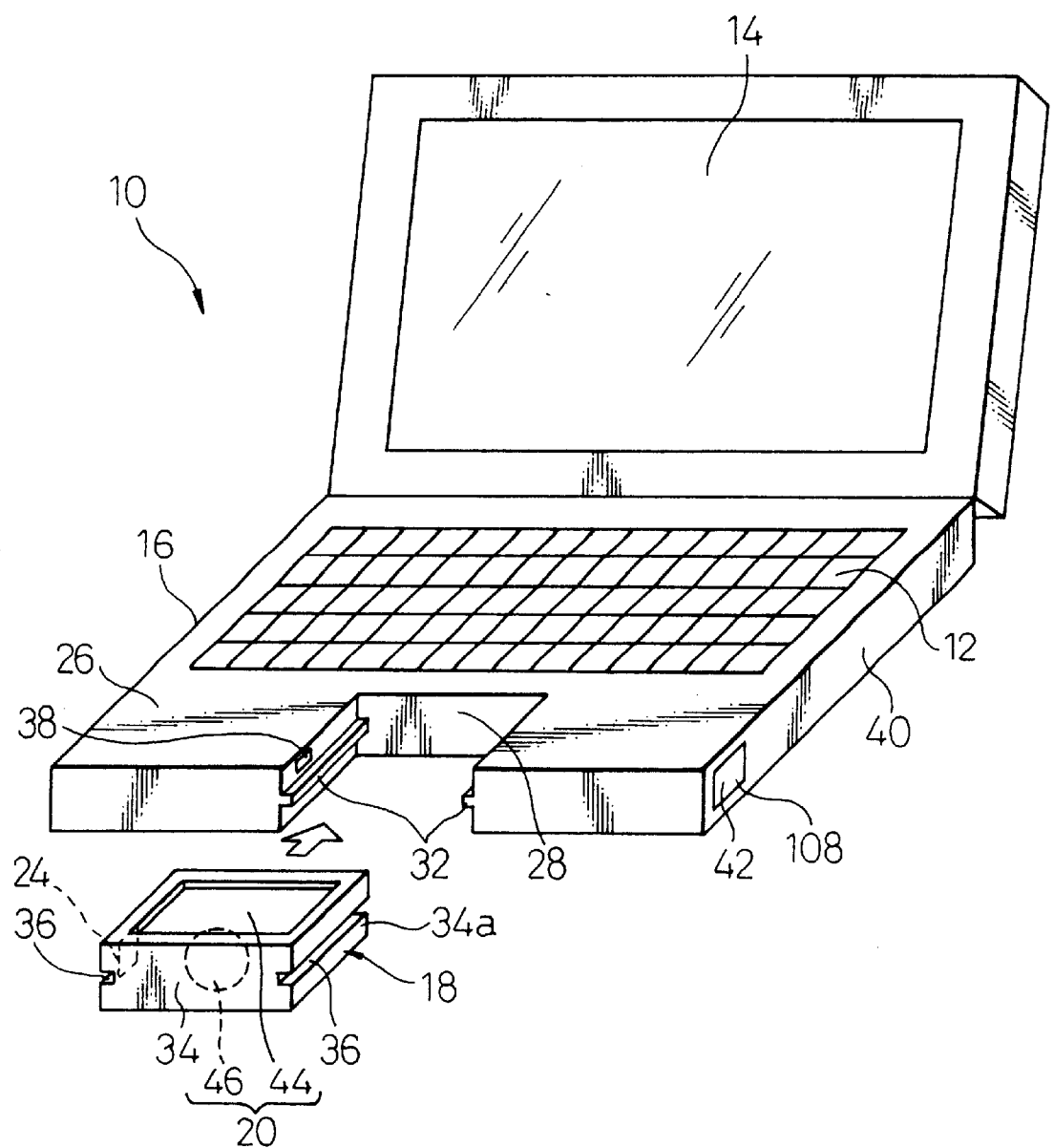
FIG. 1 is a schematic perspective view showing one embodiment of a data processing equipment according to the present invention, with a detachable pointing device being detached from a housing.

Referring now to the drawings, wherein the same or similar components are designated by the same reference numerals, FIGS. 1 and 2 schematically illustrate one embodiment of a data processing equipment 10 according to the present invention. The data processing equipment 10 is shown as a lap-top type personal computer compactly provided with a keyboard 12, a display 14 and a pointing device 18. The pointing device 18 is detachably mounted to a front region of a base housing 16, in which the keyboard 12 is provided, at a generally center position of the front region.

The pointing device 18 is a data input device which can be operated by operator's hand or fingers for entering analog information, to instruct the processing equipment 10 on coordinate data used to displace a character or a cursor on the display 14 in a desired direction for a desired distance. The pointing device 18 includes an analog information entering section 20 which can be operated in two or more modes for different entering operations, a processing section 22 for converting analog information entered by the entering section 20 into digital coordinate data, and a light emitting section 24 for converting coordinate data signals output from the processing section 22 into light signals and transmitting the latter. The respective components of the pointing device 18 will be described in more detail later.

The data processing equipment 10 is provided with a mount section 28 to which the pointing device 18 is detachably mounted, in the generally center of an armrest region 26 defined at a front side of the keyboard 12 in the base housing 16. The mount section 28 is formed in the base housing 16 as a recess or receptacle opening toward the upper, lower and front sides of the housing, as illustrated. Opposed side walls 30 defining the mount section 28 are provided with straight ribs 32 projecting from the respective side walls 30. The straight ribs 32 serve as a guide member for guiding and supporting the pointing device 18 at a proper position.

On the other hand, the pointing device 18 is provided on the outer surfaces of the opposed side walls 34a of a casing 34 thereof with straight grooves 36 recessed in the respective side walls 34a. The straight grooves 36 serve as corresponding guide members for receiving the ribs 32. The pointing device 18 can be directed in a sliding manner into a proper position in the mount section 28 by the engagement between the respective ribs 32 and grooves 36, and is supported by the engagement at the proper position with the side walls 34a respectively facing the side walls 30 of the mount section 28.

The data processing equipment 10 also includes a first light receiving section 38 located along one side wall 30 of the mount section 28 of the base housing 16, and a second light receiving section 42 located along one outer wall 40 of the base housing 16. The first and second light receiving sections 38, 42 receive the light signal emitted from the light emitting section 24 of the pointing device 18 and transfer the light signal to a processing unit (not shown) accommodated in the base housing 16 of the data processing equipment 10. As described later, the first light receiving section 38 receives the light signal when the pointing device 18 is attached to the mount section 28 of the base housing 16 and is used as a built-in device, and the second light receiving section 42 receives the light signal when the pointing device 18 is detached from the base housing 16 and is used as a separate device.

Figure 3A:
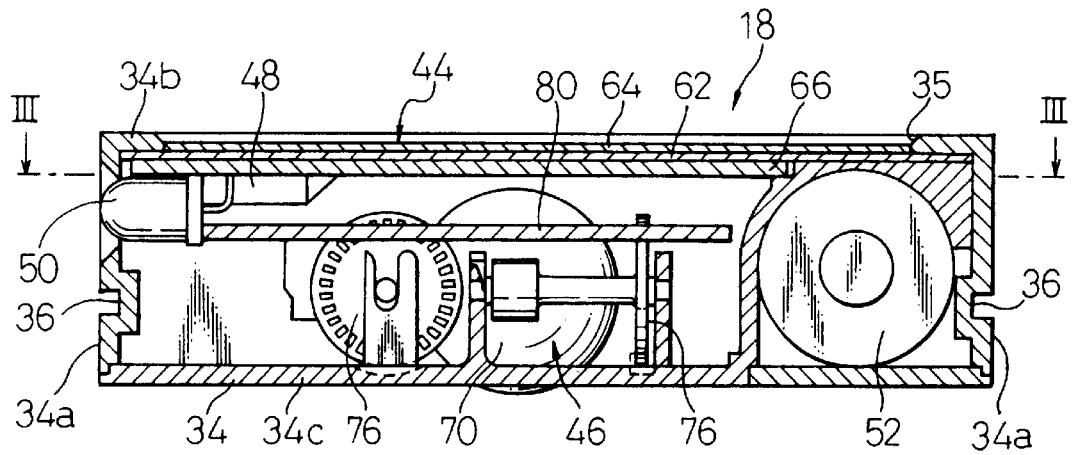
FIG. 3A is a vertical sectional view showing a first embodiment of a detachable pointing device according to the present invention.
Figure 3B:
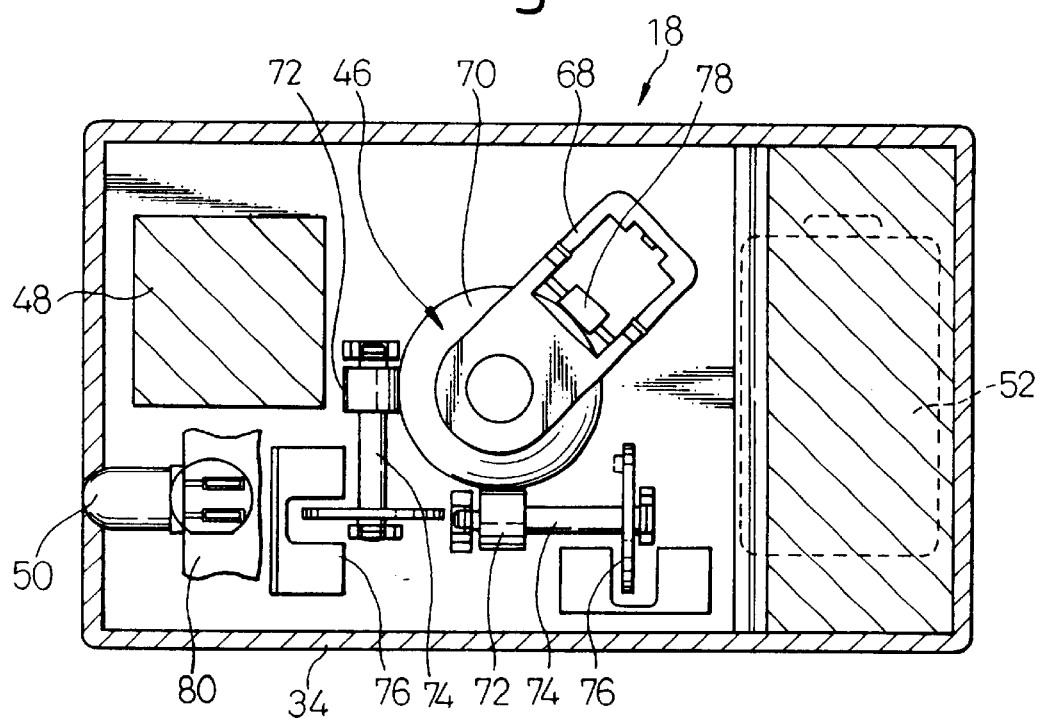
FIG. 3B is a horizontal sectional view of the detachable pointing device taken along a line III—III of FIG. 3A.

As shown in FIGS. 3A and 3B, the detachable pointing device 18, according to the first embodiment of the present invention, includes a sheet-operation entering section 44 and a ball-operation entering section 46, both acting as the analog information entering section 20 operated in two modes for different entering operations, a CPU 48 acting as the processing section 22 for converting analog information entered through the entering sections 44, 46 into digital coordinate data, a light emitting element 50 acting as the light emitting section 24 for converting data signals output from the CPU 48 into light signals and transmitting the latter, and a power source 52 such as a dry battery. The light emitting element 50 preferably emits infrared signals which can be readily separated from natural light.

Figure 4:
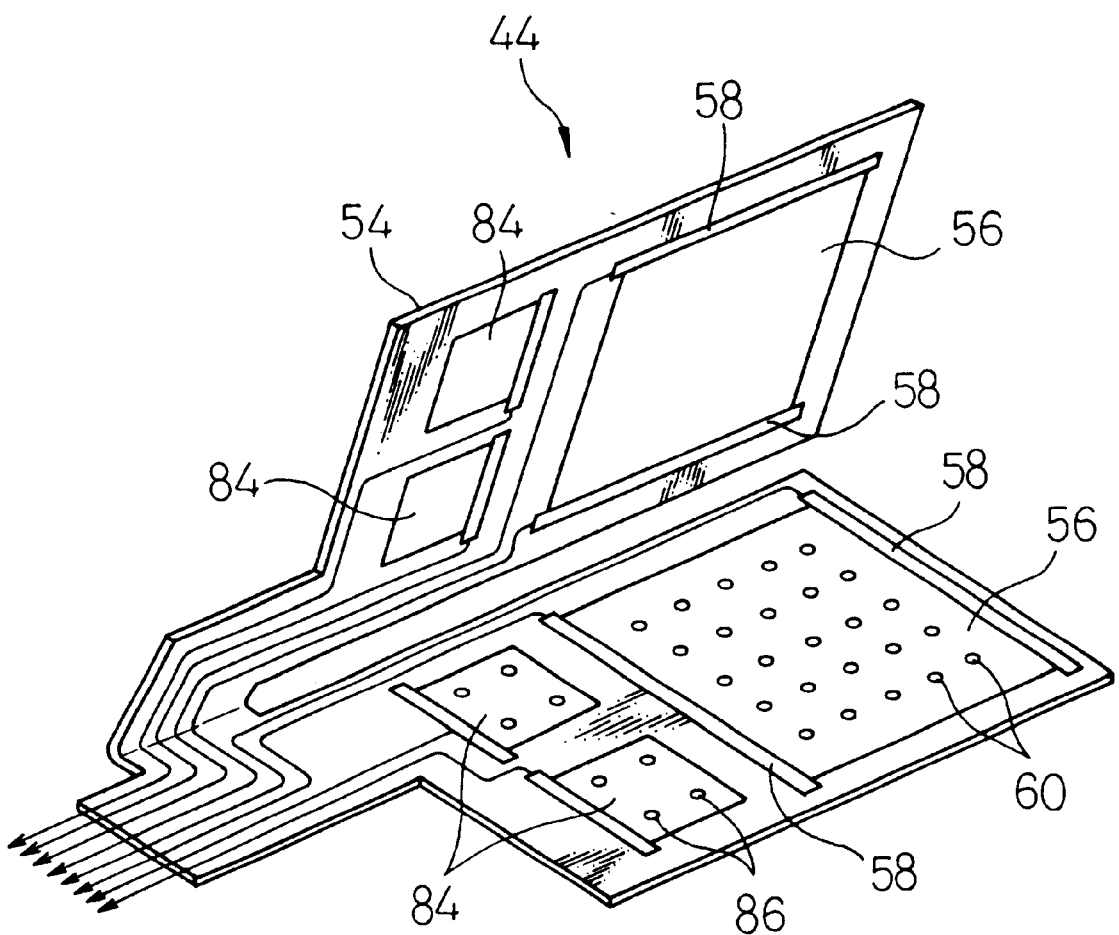
FIG. 4 is a perspective view showing a sheet-operating entering section of the pointing device of FIG. 3A in a developed state.

The sheet-operation entering section 44 has a flat surface pushing structure, which is known in itself in the conventional pointing devices. As shown in FIG. 4, the sheet-operation entering section 44 includes an insulating substrate 54 made of a resinous film, two conductive layers 56 with the same dimensions arranged on the surface of the insulating substrate 54, two pairs of electrodes 58 arranged along the opposed edges of the respective conductive layers 56 while one pair being shifted into 90 degrees relative to the other pair, and a number of insulating spacers 60 distributed at predetermined positions on the surface of one conductive layer 56. The two conductive layers 56 are superposed in an alignment with each other by folding the insulating substrate 54, and are normally held in a mutually spaced position by the insulating spacers 60.

A predetermined voltage is alternately applied on the conductive layers 56 between the respective pairs of electrodes 58 thereof. In this state, when one conductive layer 56 is pushed by, e.g., an operator's finger at a desired position from the outside of the insulating substrate 54, the conductive layers 56 are brought into contact with each other at the pushed position to allow conduction therebetween, and a divided voltage corresponding to the pushed position is measured in the other conductive layer 56. By measuring the divided voltage generated alternately in the respective conductive layers 56, the two-dimensional coordinates of the pushed position are identified.

The sheet-operation entering section 44 is securely mounted in the upper portion of the casing 34, and is constituted by a flat sheet member 62 formed by folding the insulating substrate 54 as described above and arranged in an opening 35 provided in an upper wall 34b of the casing 34, the sheet member 62 being preferably covered by a protective film 64. The sheet member 62 is supported by a printed circuit board 66 fixed in an upper region of the interior of the casing 34, and is electrically connected to the CPU 48 mounted on the printed circuit board 66. The operator operates the sheet-operation entering section 44 by pushing the outer surface of the insulating substrate 54 of the sheet member 62 arranged in the upper wall opening 35 of the casing 34 by a finger and by shifting the finger thereon in a sliding manner. As a result, the shifting direction and distance of a position pushed by the finger are entered into the CPU 48 as analog information through the pair of conductive layers 56, and converted in the CPU 48 into the coordinate data signals in the rectangular coordinates system.

The ball-operation entering section 46 has a rotating structure which is known in itself in the conventional pointing devices. As shown in FIG. 3, the ball-operation entering section 46 includes a ball 70 rotatably supported by a support member 68, two rollers 72 adapted to contact with the ball 70 to rotate respectively about mutually orthogonal two axes together with the rotating ball 70, and two encoders 76 provided at the ends of two shafts 74 carrying the respective rollers 72. The support member 68 includes a support roller 78 biased by a biasing member such as a spring (not shown), and keeps the ball 70 continuously contacting with two rollers 72 by urging the support roller 78 onto the ball 70. Therefore, the ball 70 is rotatably supported by two rollers 72 and the support roller 78. When the ball 70 rotates, two rollers 72 also rotate together with the ball 70, and two encoders 76 respectively detect the rotation angles of two shafts 74 arranged orthogonally to each other.

The ball-operation entering section 46 is disposed in a lower region of the interior of the casing 34, and is constituted by the ball 70 laterally positioned by the supporting roller 78 and two rollers 72 and partially inserted into a through-opening (not shown) formed in the lower wall 34c of the casing 34 of the pointing device 18. Two encoders 76 are electrically connected to the CPU 48 mounted on the printed circuit board 66 through a second printed circuit board 80 secured in the casing 34 at a position beneath the printed circuit board 66. The operator operates the ball-operation entering section 46 by, e.g., shifting the pointing device 18 in a desired direction along a stationary surface of a desk to rotate the ball 70. As a result, the rotational direction and angle of the ball 70 are entered as analog information into the CPU 48 through the encoders 76, and converted in the CPU 48 into the coordinate data signals of the rectangular coordinates system.

Figure 5:
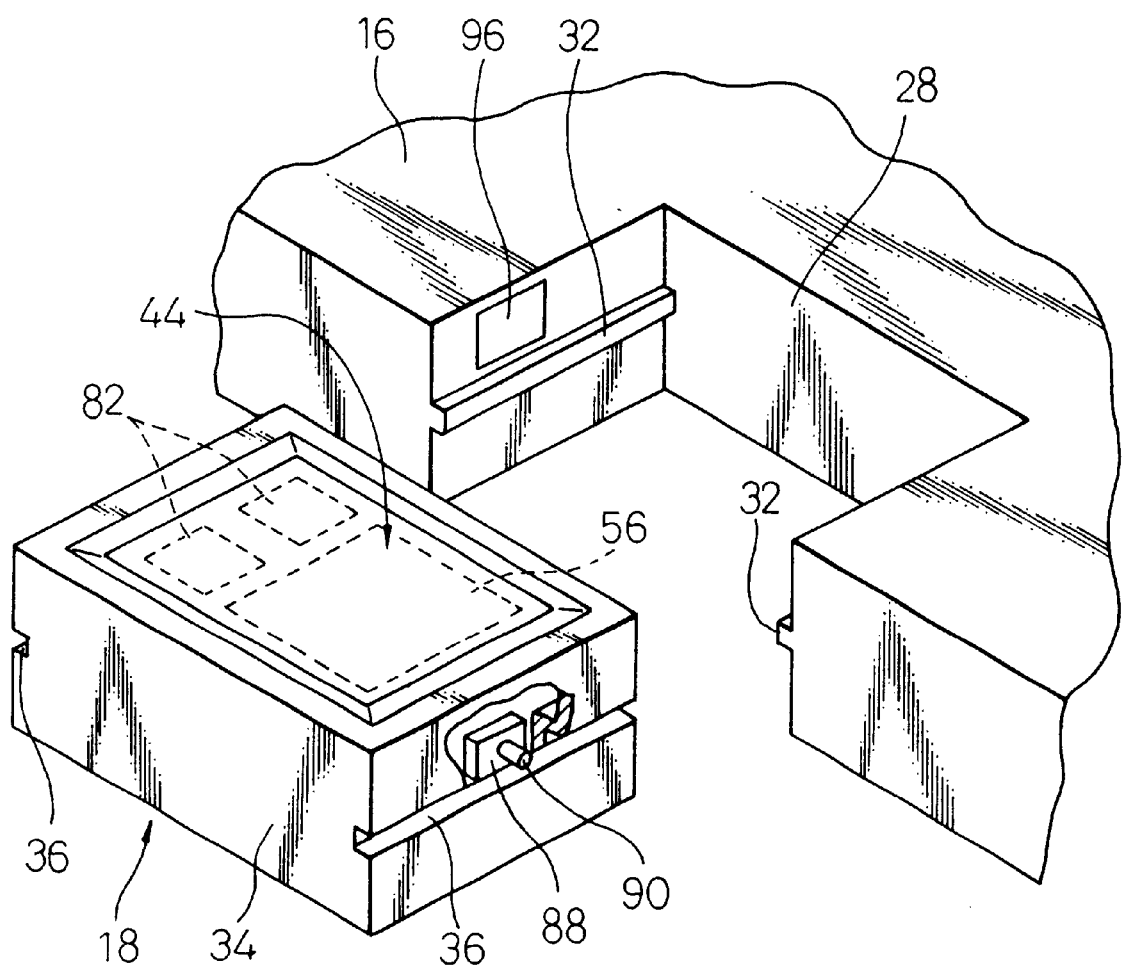
FIG. 5 is a partially enlarged perspective view showing a switching mechanism of the data processing equipment of FIG. 1.

The analog information entered into the CPU 48 through the sheet-operation entering section 44 and the ball-operation entering section 46 is converted to the digital coordinate data in the CPU 48, and emitted as light signals from the light emitting element 50 mounted on the printed circuit board 66. The processing unit of the data processing equipment 10 receives the coordinate data signals as light signals through the first light receiving section 38 or the second light receiving section 42, and two-dimensionally moves a character or a cursor on the display 14 in accordance with the command of the operator. In addition to such a cursor operating function, the pointing device 18 is provided with two switches 82 having a function of so-called click buttons known in the conventional pointing devices (see FIG. 5).

As shown in FIG. 4, these two switches 82 are structured by two pairs of conductive layers 84 disposed in the vicinity of the pair of conductive layers 56 on the insulating substrate 54 of the sheet-operation entering section 44. The conductive layers 84 of one pair of layers constituting each switch 82 are superposed in an alignment with each other by folding the insulating substrate 54, and are normally held in a mutually spaced position by a plurality of insulating spacers 86. A certain voltage is applied between the pair of conductive layers 84 superposed with each other. In this state, when one conductive layer 84 is pushed by, e.g., an operator's finger at a desired position from the outside of the insulating substrate 54, the conductive layers 84 are brought into contact with each other at the pushed position to allow conduction therebetween and to close a circuit, and an ON signal is supplied to the CPU 48. The ON signal is emitted as a light signal of, e.g., an infrared ray from the light emitting element 50 in the same manner as the coordinate data signal.

The pointing device 18 is constituted to suitably select one of these two analog information entering sections, i.e., of the sheet-operation entering section 44 and the ball-operation entering section 46, and to optionally utilize the selected one. More specifically, when the pointing device 18 is attached to the mount section 28 of the base housing 16 of the processing equipment 10 and is used as a built-in device, the sheet-operation entering section 44 is given priority in function, and the operator thus operates the pointing device 18 in the same manner as the conventional built-in sheet-operation pointing device. On the other hand, when the pointing device 18 is detached from the base housing 16 and is used as a separate device, the ball-operation entering section 46 is given priority in function, and the operator thus operates the pointing device 18 in the same manner as the conventional separate mouse. The pointing device 18 may further include a change-over switch 88 serving as a mechanism for switching the above-described functions, as shown, e.g., in FIG. 5.

Figure 6A:
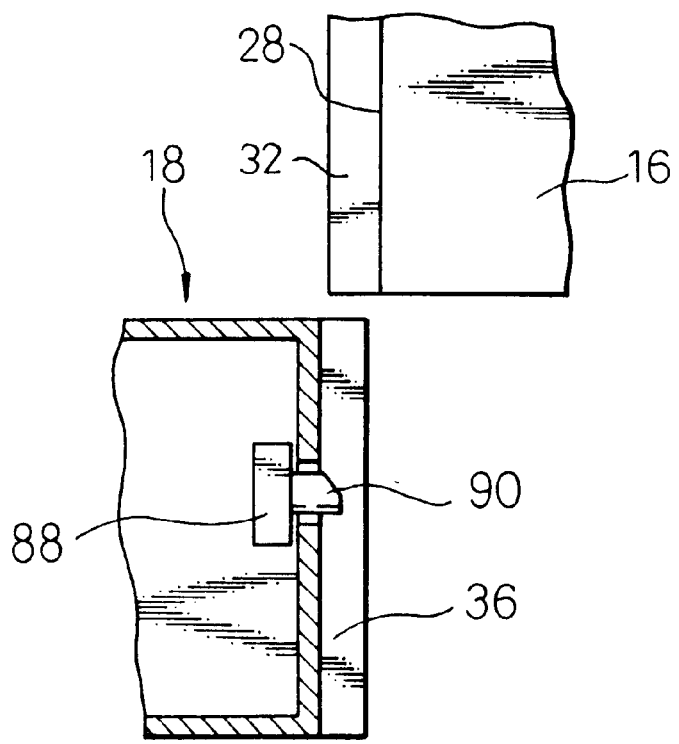
FIG. 6A shows the operation of the switching mechanism of FIG. 5 when the pointing device is detached from the housing.
Figure 6B:
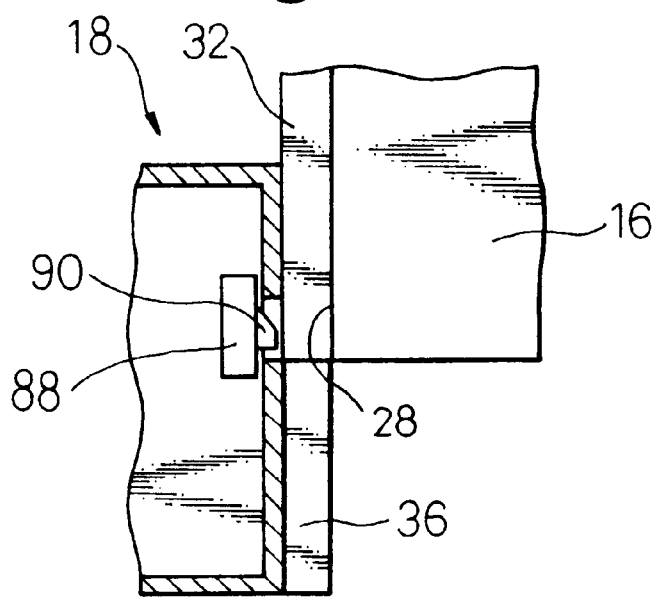
FIG. 6B shows the operation of the switching mechanism of FIG. 5 when the pointing device is attached to the housing.

The change-over switch 88 is structured as a push button switch, and is securely disposed inside the casing 34 to locate a movable element 90 of the switch 88 in one groove 36 of the casing 34. As shown in FIG. 6A, when the pointing device 18 is detached from the mount section 28 of the base housing 16 and is used as a separate device, the movable element 90 projects into the groove 36. On this occasion, an electrical circuit is designed to give the ball-operation entering section 46 priority in function and to shut off an input signal from the sheet-operation entering section 44. On the other hand, as shown in FIG. 6B, when the pointing device 18 is attached to the mount section 28 and is used as a built-in device, the movable element 90 is pushed inward by the rib 32 engaged in the groove 36 to change over the switch position. On this occasion, an electrical circuit is designed to give the sheet-operation entering section 44 priority in function and to shut off an input signal from the ball-operation entering section 46.

Figure 7:
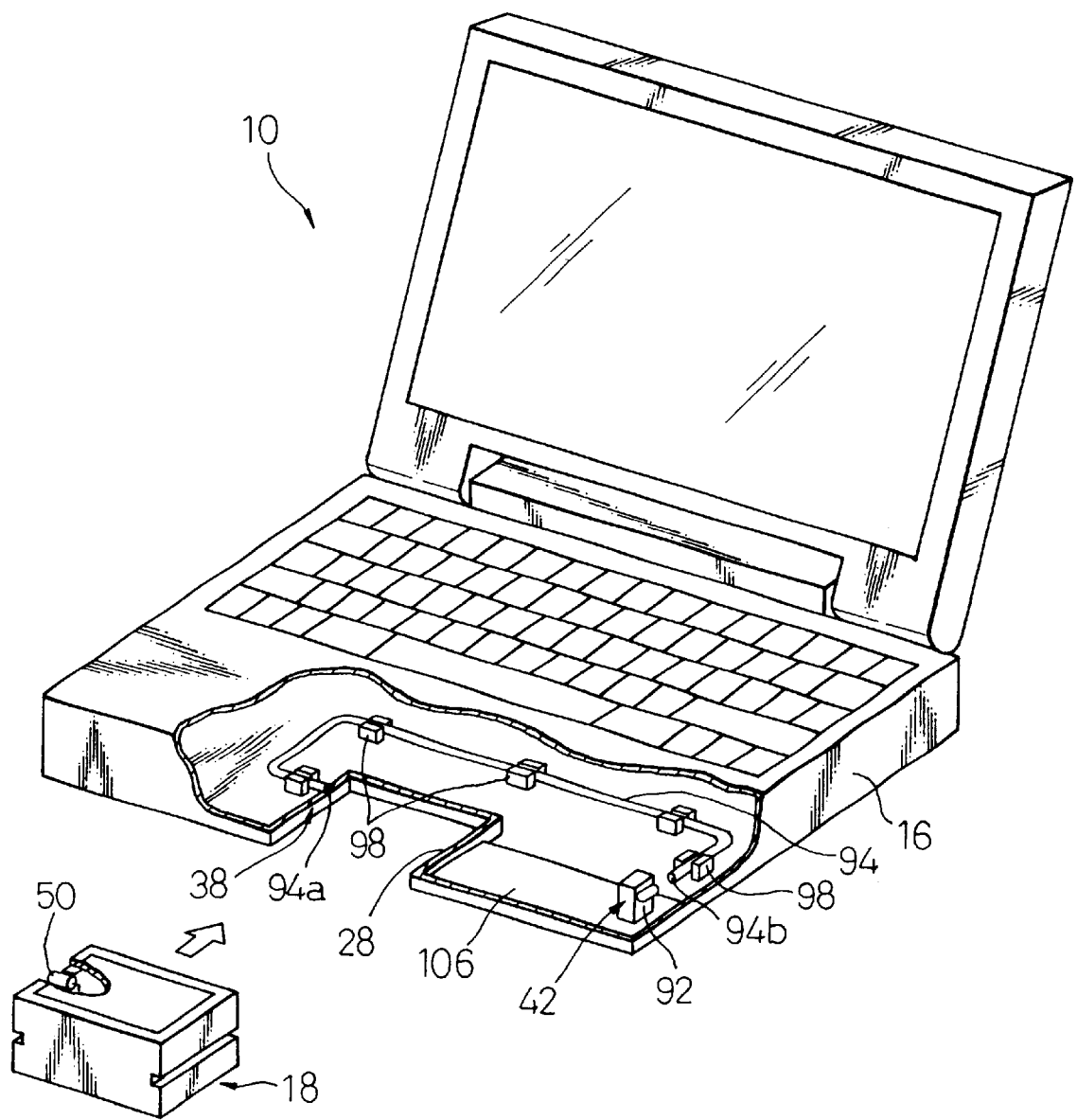
FIG. 7 is a partially cut-out perspective view showing an optical transmission line of the data processing equipment of FIG. 1.

As described above, the data processing equipment 10 according to the embodiment of the present invention is provided with the first light receiving section 38 and the second light receiving section 42, and either one of the light receiving section 38, 42 receives the light signal of, e.g., an infrared ray emitted from the light emitting section 24 of the pointing device 18, in accordance with the above-mentioned operating mode of the pointing device 18. In this respect, both of the first and second light receiving sections 38, 42 may be provided respectively with photo-detection elements. It is, however, advantageous that only the second light receiving section 42 is provided with a photo-detection element 92, as shown in FIG. 7. In this arrangement, the first light receiving section 38 may transmit the received light signal to the photo-detection element 92 of the second light receiving section 42 through an optical fiber 94 as an optical transmission line. This results in the reduction of the number of photo-detection elements and the reduction of the production cost of the data processing equipment 10.

Figure 8:
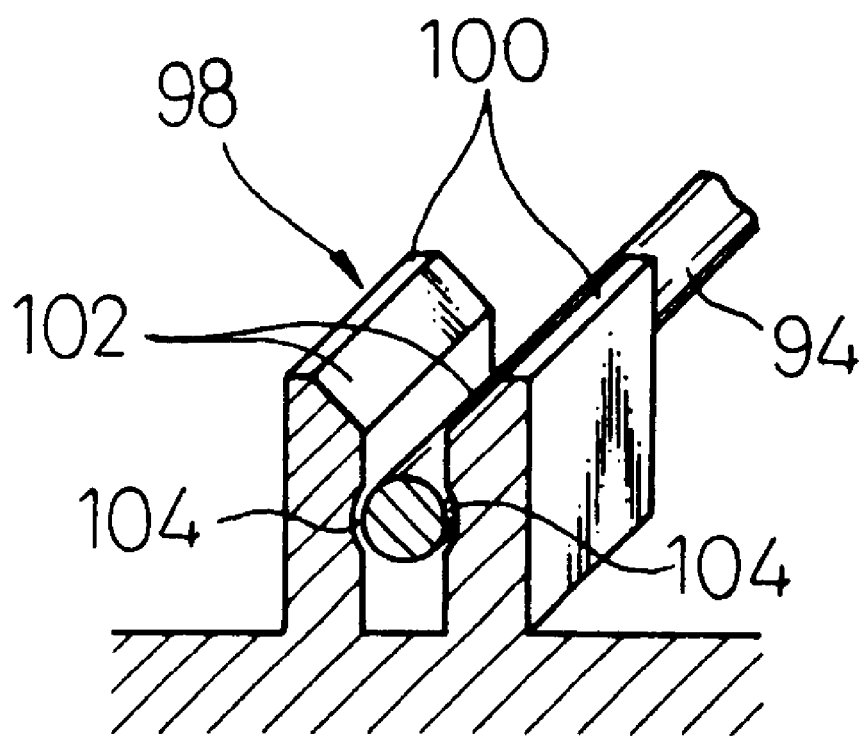
FIG. 8 is an enlarged perspective view showing a support of the optical transmission line of FIG. 7.

The optical fiber 94 is arranged in such a manner that a first axial end surface 94a thereof is disposed in a light receiving window 96 (FIG. 5) of the first light receiving section 38 and a second axial end surface 94b thereof is disposed near the photo-detection element 92 in the second light receiving section 42. In this state, the optical fiber 94 is securely supported at a predetermined position by a plurality of supports 98 provided on the inner surface of the base housing 16. As shown in FIG. 8, each support 98 includes a pair of projections 100 projecting from the inner surface of the base housing 16 with a predetermined gap defined therebetween. Opposed tapered surfaces 102 are formed at free ends of the respective projections 100, and retaining grooves 104 are formed to face to each other on the opposed surfaces of the projections 100. The optical fiber 94 is pressed into the gap between the is projections 100 through the tapered surfaces 102, and is held in the retaining grooves 104 by the elastic restoring force of the projections 100.

The photo-detection element 92 is mounted on a printed circuit board 106 incorporated in the base housing 16, and receives or detects the light signal of, e.g., an infrared ray emitted from the light emitting element 50 of the pointing device 18 and transferred either from the first light receiving section 38 through the optical fiber 94 or directly from the second light receiving section 42. The detected light signal is then transmitted to the processing unit (not shown) of the data processing equipment 10. In this respect, to facilitate the direct detection at the second light receiving section 42, the second axial end surface 94b of the optical fiber 94 is preferably arranged at the oblique front side of the photo-detection element 92 or at the lateral side of the latter. Alternatively, when an infrared-ray transmittable filter is provided in a light receiving window 108 (FIG. 1) of the second light receiving section 42, it is possible to reflect the light signal emitted from the second axial end surface 94b of the optical fiber 94 by the infrared-ray transmittable filter to irradiate the photo-detection element 92. In this arrangement, it is not necessary to forcibly bend the optical fiber 94 to orient the second axial end surface 94b toward the photo-detection element 92, whereby the damage of the optical fiber 94 is advantageously prevented.

In the above construction, it is desired that, when the pointing device 18 is mounted in the mount section 28 of the base housing 16, the light emitting element 50 of the light emitting section 24 is precisely aligned with the first axial end surface 94a of the optical fiber 94 positioned in the first light receiving section 38, for decreasing a transmission loss. For this purpose, the data processing equipment 10 is provided with a fastening mechanism for positioning and fastening the pointing device 18 at a proper position in the mount section 28 of the base housing 16.

Figure 9:
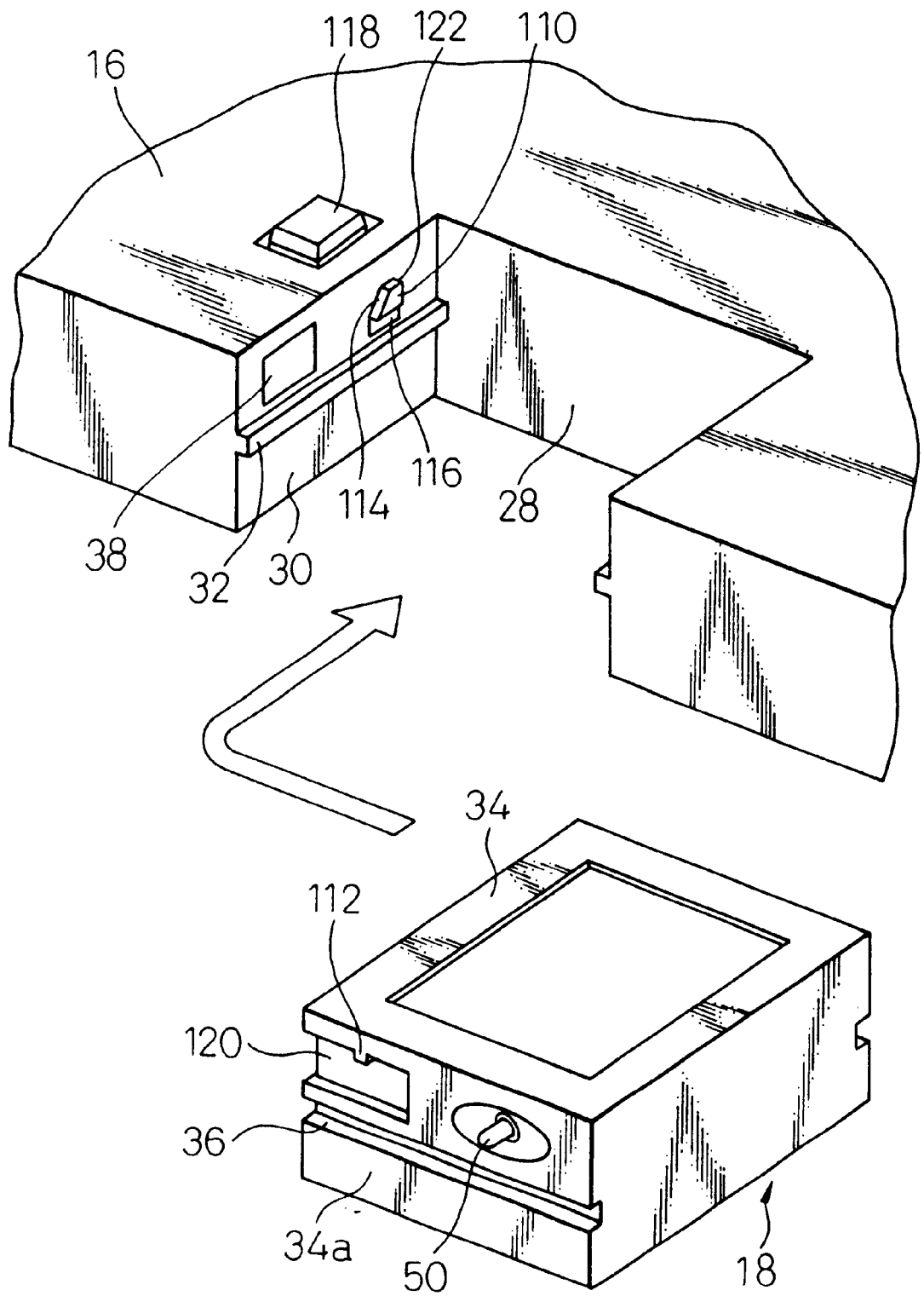
FIG. 9 is a partially enlarged perspective view showing a fastening mechanism of the data processing equipment of FIG. 1.

As shown in FIG. 9, the fastening mechanism is structured by a movable fastening member 110 provided in one side wall 30 of the mount section 28 of the base housing 16 and a pawl 112 formed on one side wall 34a of the casing 34 of the pointing device 18. The movable fastening member 110 includes a portion having a slanted surface 114, which projects from an opening 116 formed in the side wall 30 of the mount section 28, and is movable upward and downward along the opening 116. The movable fastening member 110 is biased upward by a biasing means (not shown) and is normally disposed at the upper end position of the opening 116. A push part 118 integrally provided on the movable fastening member 110 thereby projects from the upper surface of the base housing 16. The pawl 112 projects into a second groove 120 recessed parallel to the guide groove 36 in the side wall 34a of the casing 34.

When the pointing device 18 is inserted into the mount section 28 while the ribs 32 formed in the mount section 28 are respectively engaged with the grooves 36 formed in the casing 34, the portion with the slanted surface 114 of the movable fastening member 110 is introduced into the second groove 120, and the pawl 112 is abutted onto the slanted surface 114 to push down the movable fastening member 110 along the opening 116. When the pawl 112 passes the slanted surface 114, the movable fastening member 110 returns to the upper end position along the opening 116 by the biasing means, and a shoulder 122 of the movable fastening member 110 formed opposite to the slanted surface 114 is engaged with the pawl 112. As a result, the pointing device 18 is located and held at the proper position in the mount section 28. When the pointing device 18 would be detached from the mount section 28, the push part 118 of the movable fastening member 110 is pushed down into the base housing 16 to disengage the shoulder 122 from the pawl 112.

As will be understood from the above, the data processing equipment 10 enables the pointing device 18 to be easily and smoothly operated by an operator for a correct entering operation of coordinate data and to accurately instruct the processing unit of the data processing equipment 10 on coordinate data signals without a signal reversing problem, in both states when the pointing device 18 is attached to the mount section 28 and is used as a built-in device and when the pointing device 18 is detached from the mount section 28 of the base housing 16 and is used as a separate device, by suitably and optionally using the sheet-operation entering section 44 on the top surface of the pointing device 18 and the ball-operation entering section 46 on the bottom surface of the latter.

Accordingly, it is possible to eliminate a matching circuit and a change-over switch, both required for avoiding the signal reversing problem in the conventional built-in mouse of JP-A-9-244805, and the pointing device 18 is allowed to be provided with the click switches 82 only on the top surface of the casing 34, so that the structures and control systems of both the processing equipment 10 and the pointing device 18 can be simplified. Also, since the pointing device 18 transmits data signals as light signals, troublesome cable handling is eliminated, which improves the operability of the pointing device 18 and the portability of the data processing equipment 10.

Figure 11A:
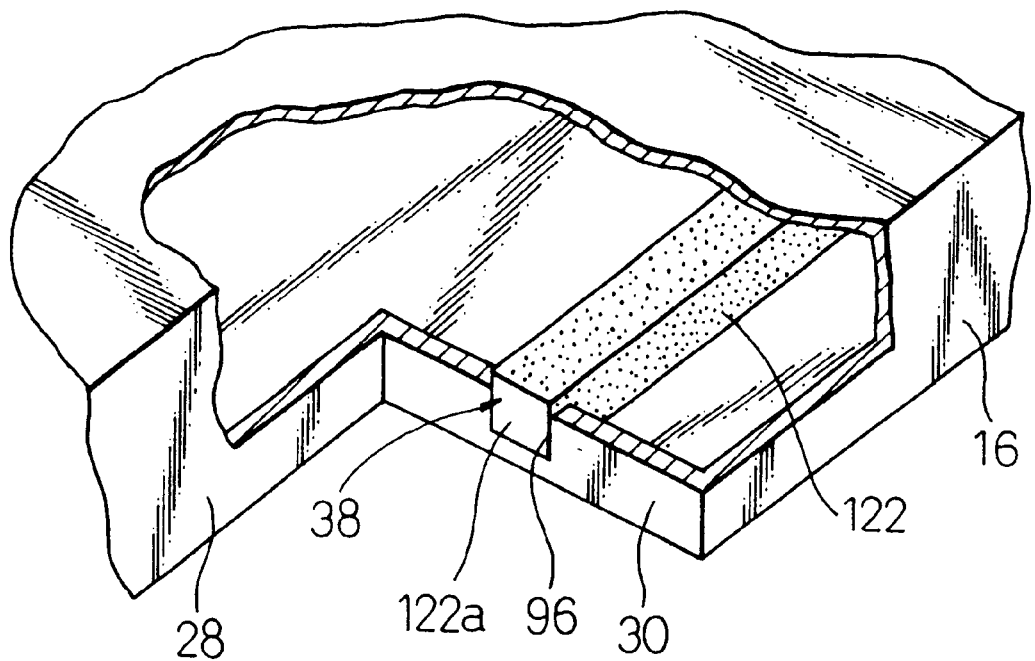
FIG. 11A is a partially cut-out enlarged view of the optical transmission line of FIG. 10, showing a first light receiving section.
Figure 11B:
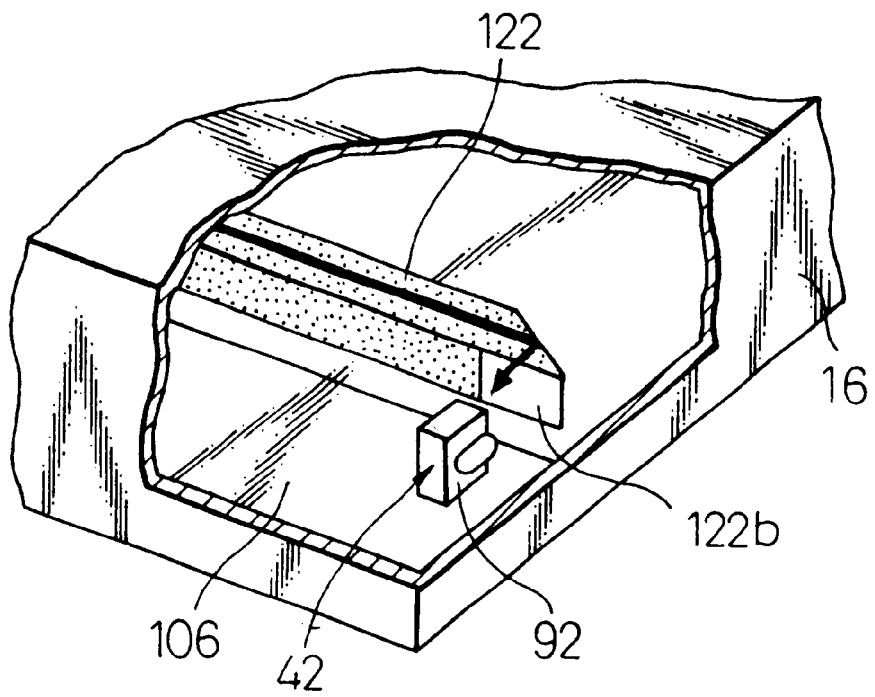
FIG. 11B is a partially cut-out enlarged view of the optical transmission line of FIG. 10, showing a second light receiving section.

The above embodiment of the data processing equipment may have various modifications. For example, the optical transmission line provided in the base housing 16 of the data processing equipment 10 for transmitting light signals between the first light receiving section 38 and the second light receiving section 42 may be an optical waveguide member 122, instead of the optical fiber 94, which is made from a transparent resinous rod member with a metallic coating layer coated on the outer surface thereof. As shown in FIGS. 10, 11A and 11B, the optical waveguide member 122 is arranged in such a manner that a first axial end surface 122a thereof is disposed in the light receiving window 96 of the first light receiving section 38 and a second axial end surface 122b thereof is disposed near the photo-detection element 92 in the second light receiving section 42. In this state, the optical waveguide member 122 is securely supported at a predetermined position by the supports 98 provided on the inner surface of the base housing 16.

The optical waveguide member 122 can transmit light signals between the axial end surfaces 122a and 122b by coating the outer surfaces of the resinous rod member except for the end surfaces 122a, 122b with the metallic coating layer. In the illustrated modification, the first axial end surface 122a is formed vertical to an axis of the rod member and the second axial end surface 122b is formed parallel to the rod axis. The light signal received at the first light receiving section 38 is incident on the first axial end surface 122a into the resinous rod member, is reflected by an inclined face formed adjacent to the second axial end surface 122b, and is irradiated from the second axial end surface 122b toward the photo-detection element 92 (shown by an arrow in FIG. 11B). In this respect, materials suitably used for the optical waveguide member 122 are an acrylic resin, a polycarbonate resin, an ABS resin and so on, as the transparent resinous rod member, and nickel, aluminum and so on, as the metal coating layer. The metal coating method may be vacuum deposition, electrolytic plating, electroless plating, painting, or adhesion of a thin film.

In the modification of FIG. 10, the first light receiving section 38 is provided in the mount section 28 of the base housing 16 on the right side wall 30 opposed to the left side wall 30 provided with the first light receiving section 38 in the above embodiment shown in FIG. 1. In this case, when the pointing device 18 is mounted in the mount section 28 so as to align the light emitting element 50 with the first light receiving section 38, two switches 82 are arranged on a righthand side. Also, as shown in FIG. 11A, the light receiving window 96 may be formed under the rib 32 (FIG. 5) of the mount section 28, and the light emitting element 50 of the pointing device 18 may be correspondingly arranged under the groove 36 (FIG. 10). Thus, the first light receiving section 38 may be located at various positions in the mount section 28 in correspondence with the variation of positions of the switches 82 in the sheet-operation entering section 44 when the pointing device 18 is mounted in the mount section 28 and/or of the light emitting element 50 in the pointing device 18.

Also, the second light receiving section 42 may be located at various positions in the base housing 16, on condition that the light signal is easily received by the receiving section 42 when the operator uses the pointing device 18 as a separate mouse. The second light receiving section 42 may also be provided at plural positions. Moreover, the photo-detection element 92 may be provided in one of the first light receiving section 39 and one or more second light receiving sections 42 or in a desired position remote from all of the light receiving sections 38, 42, so, that the light signal being incident on the light receiving section 38 or 42 having no photo-detection element 92 is transmitted to the photo-detection element 92 through the optical transmission line.

Figure 12:
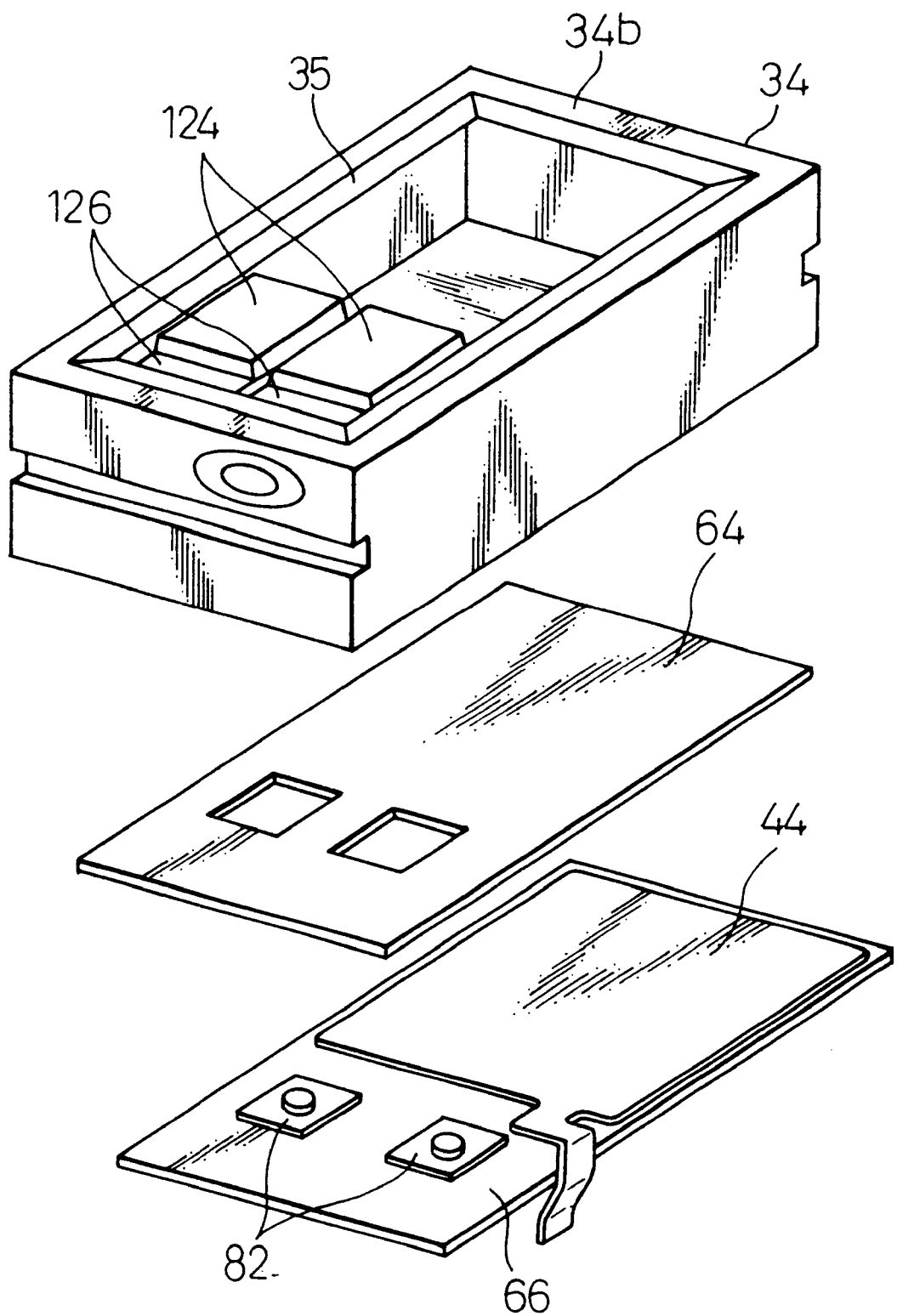
FIG. 12 is a partially exploded perspective view of the pointing device having a modification of the click switches.

As shown in FIG. 12, two switches 82 of the pointing device 18 may be constructed as switches independent of the sheet-operation entering section 44. In this arrangement, two switches 82, including contacts opened or closed by pushing force, are mounted on the printed circuit board 66 supporting the sheet-operation entering section 44 near the latter. A pair of pushing pieces 124 are joined in a cantilever manner to the upper wall 34b of the casing 34 through joints 126. The sheet-operation entering section 44 is disposed in the opening 35 of the casing 34 with the protective film 64 covering the entering section 44, and thereby the switches 82 are respectively arranged beneath the pushing pieces 124. When the operator pushes the pushing piece 124 by a finger, the switch is closed and a signal is entered into the CPU 48, and a click signal is emitted from the light emitting element 50 as a light signal.

As shown in FIG. 13, the change-over switch 88 for switching in function between the sheet-operation entering section 44 and the ball-operation entering section 46 in the pointing device 18 may be arranged in the other side wall 34d with no groove 36 of the casing 34. In this arrangement, the change-over switch 88 is arranged inside the casing 34 with the movable element 90 thereof being aligned with a through-hole 128 formed in the side wall 34d of the casing 34. On the other hand, a protrusion 130 is formed on a wall 31 with no rib 32, of the mount section 28 of the base housing 16 of the data processing equipment 10, at a position corresponding to the position of the change-over switch 88.

Figure 14A:
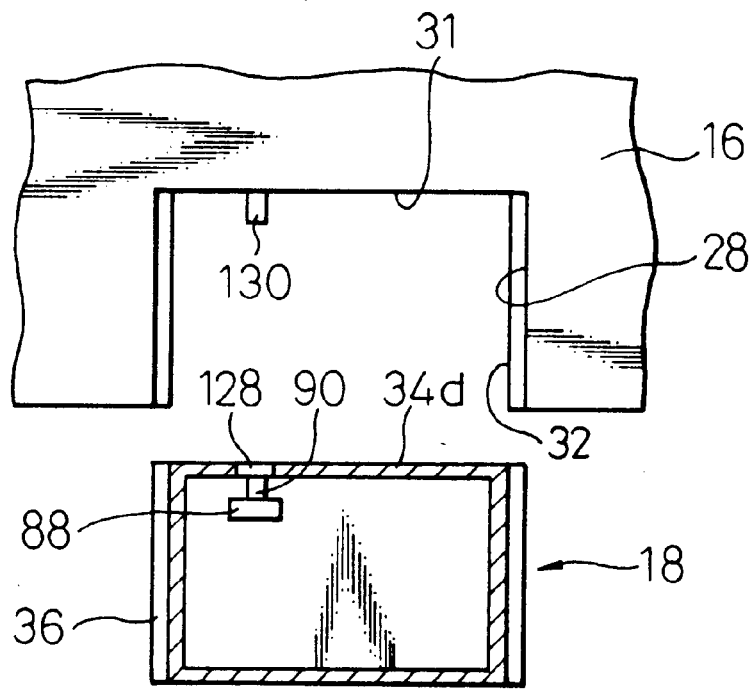
FIG. 14A shows the operation of the switching mechanism of FIG. 13 when the pointing device is detached from the housing.
Figure 14B:
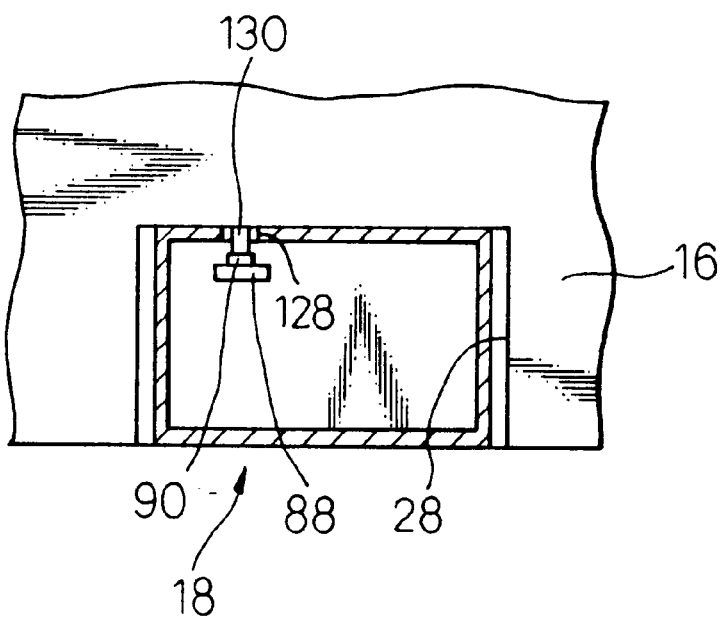
FIG. 14B shows the operation of the switching mechanism of FIG. 13 when the pointing device is attached to the housing.

As shown in FIG. 14A, when the pointing device 18 is detached from the mount section 28 of the base housing 16 and is used as a separate device, the movable element 90 projects from a switch body, and only the ball-operation entering section 46 is in a functional condition. Also, as shown in FIG. 14B, when the pointing device 18 is attached to the mount section 28 and is used as a built-in device, the movable element 90 is pushed by the protrusion 130 introduced in the through-hole 128 to change over the switch, and only the sheet-operation entering section 44 is in a functional condition, as described above.

Alternatively, instead of the change-over switch 88 actuated in association with the detachment or attachment of the pointing device 18, another change-over switch (not shown), optionally or independently operated by an operator, may be used as a mechanism for switching between the functions of the sheet-operation entering section 44 and the ball-operation entering section 46. In this arrangement, the operator can optionally use either the sheet-operation entering section 44 or the ball-operation entering section 46 when the pointing device 18 is detached from the mount section 28 of the base housing 16 and is used as a separate device. It should be noted that those change-over switches may be omitted, on condition that analog information cannot be entered simultaneously through both the entering sections 44, 46 upon separate use, by, e.g., drawing the operator's attention by a warning plate.

Alternatively, the electrical circuit (not shown) of the pointing device 18 may be designed to vary the light emission power of the light emitting element 50 in accordance with the selection between the sheet-operation entering section 44 and the ball-operation entering section 46. For example, when the pointing device 18 is attached to the mount section 28 of the base housing 16 and is used as a built-in device, the emission power of the light signals corresponding to the sheet-operation entering section 44 may be reduced in comparison with that corresponding to the ball-operation entering section 46, because the reach of the emitted light from the light emitting element 50 is allowed to be shorter than that when the pointing device 18 is detached from the mount section 28 and is used as a separate mouse. This results in the saving of the power consumption. On the contrary, if the emission power of the light signals corresponding to the sheet-operation entering section 44 is enlarged in comparison with that corresponding to the ball-operation entering section 46, it is possible to instruct the processing unit of the data processing equipment 10 by using the sheet-operation entering section 44 of the pointing device 18 detached from the mount section 28, at a remote position away from the data processing equipment 10.

Moreover, a stick-operation entering section (not shown) having the same structure as the conventional built-in stick-operation pointing device, may be provided on the upper wall of the casing 34 of the pointing device 18, instead of or in addition to the sheet-operation entering section 44.

Figure 16:
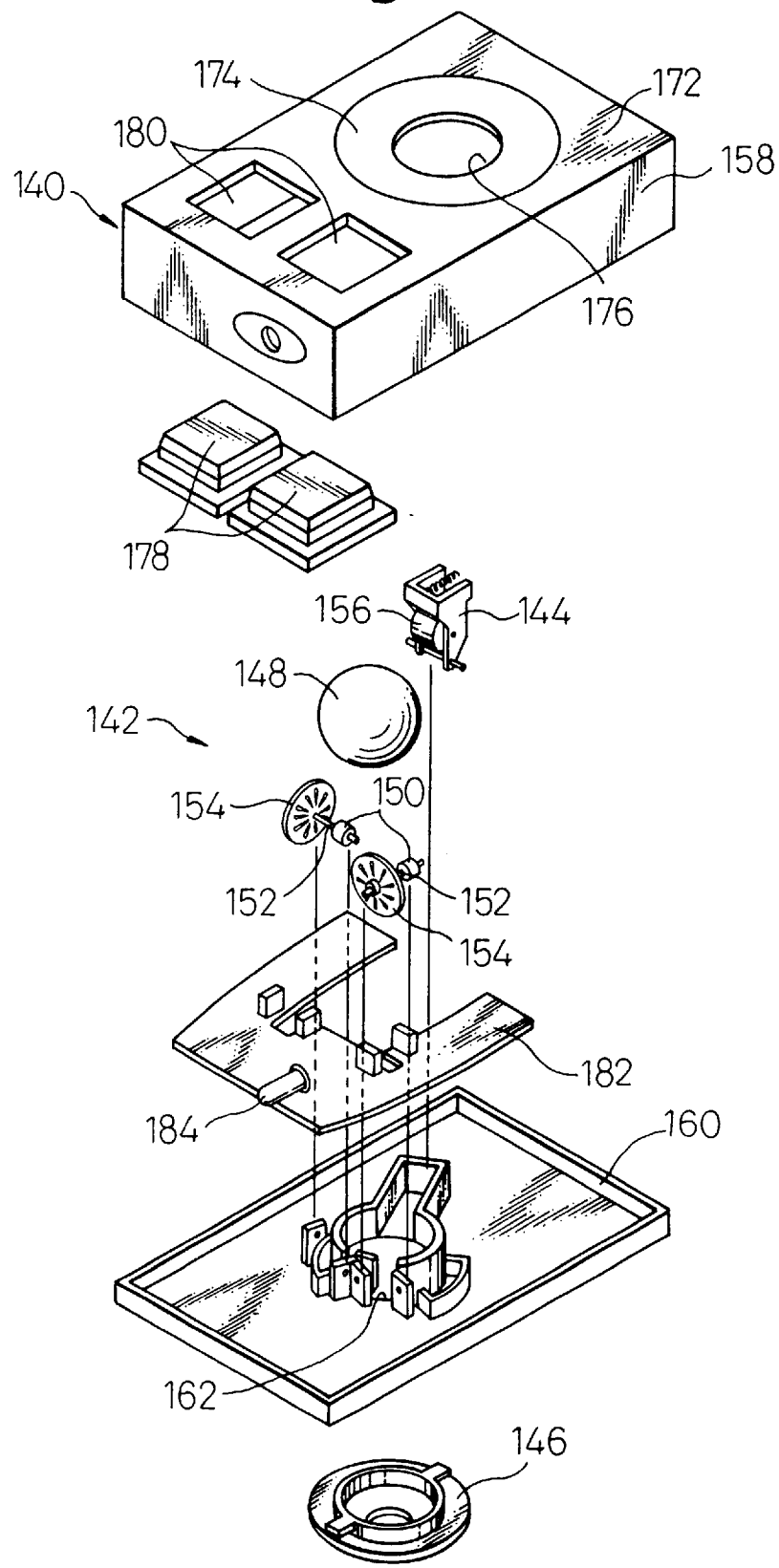
FIG. 16 is an exploded perspective view of the pointing device of FIG. 15.

FIGS. 15 to 17B schematically illustrate a detachable pointing device 140 according to a second embodiment of the present invention. The pointing device 140 includes a ball-operation entering section 142 as only one analog information entering section. As shown in FIG. 16, the ball-operation entering section 142 includes a ball 148 rotatably supported by a support member 144 and a cap 146, two rollers 150 adapted to contact with the ball 148 to rotate respectively about mutually orthogonal two axes together with the rotating ball 148, and two encoders 154 provided at the ends of two shafts 152 carrying the respective rollers 150. The support member 144 includes a support roller 156 biased by a biasing member such as a spring (not shown), and keeps the ball 148 continuously contacting with two rollers 150 by urging the support roller 156 onto the ball 148. When the ball 148 rotates, two rollers 150 also rotate together with the ball 148, and two encoders 154 respectively detect the rotation angles of two shafts 152 arranged orthogonally to each other.

Figure 17A:
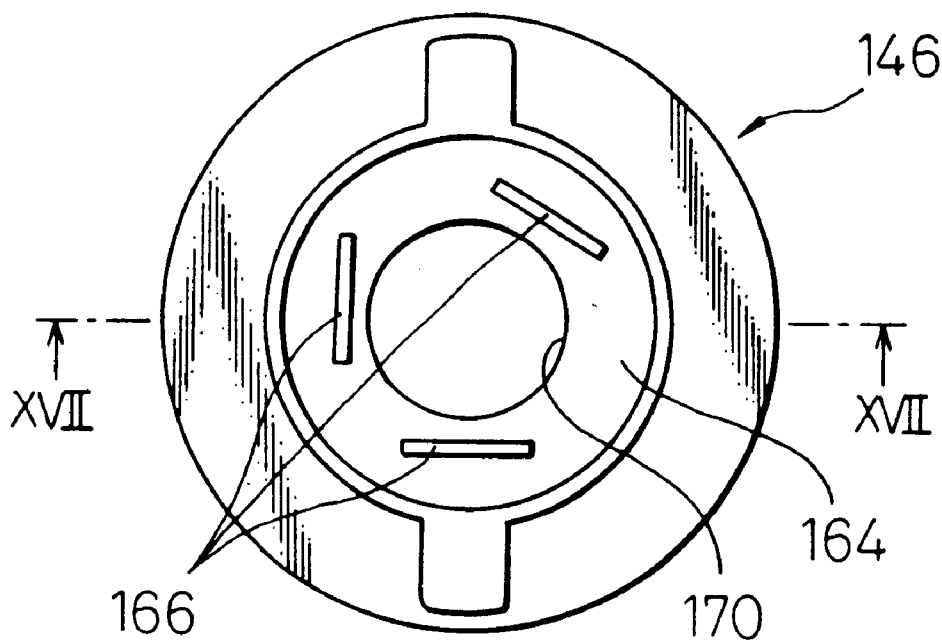
FIG. 17A is an enlarged plan view of a cap of the pointing device of FIG. 15.
Figure 17B:
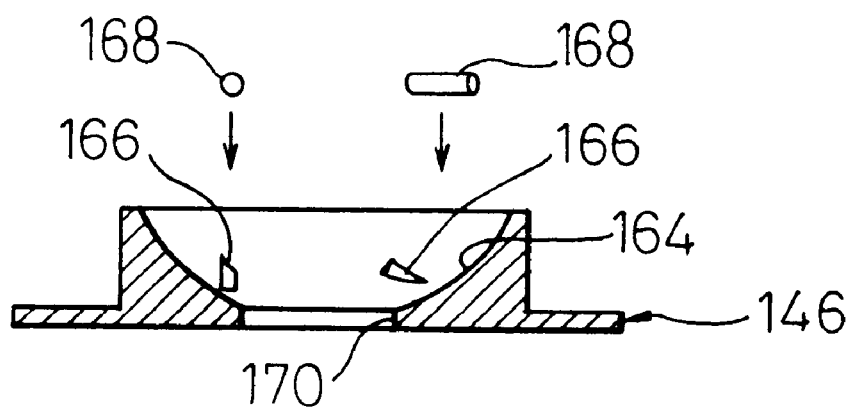
FIG. 17B is a sectional view of the cap taken along a line XVII—XVII of FIG. 17A.

The cap 146 is attached to an opening 162 formed in a bottom wall 160 of a casing 158 of the pointing device 140. As shown in FIGS. 17A and 17B, the cap 146 includes a recess 164 for receiving the ball 148. The recess 164 is provided with a plurality of grooves 166 formed in the wall thereof, and support rollers 168 are rotatably accommodated in the respective grooves 166. The ball 148 is received within the recess 164 of the cap 146 in the casing 158., and rotatably supported by the support rollers 168. In this state, the ball 148 is disposed and partially inserted into a through opening 170 formed in the recess 164 of the cap 146.

A depression 174 is recessed on the outer surface of a top wall 172 of the casing 158 at a position corresponding to the ball 148. An opening 176 is formed at a center of the depression 174. The ball 148 partially projects outward from the opening 176 of the casing 158 (FIG. 15) when the ball 148 is supported at a proper position by the support member 144 and the cap 146. Thereby, the ball-operation entering section 142 is allowed to be operated on the top wall 172 of the casing 158. The top wall 172 of the casing 158 is also provided with an opening 180 in which two switches 178 acting as click buttons are arranged.

The pointing device 140 of the second embodiment can be detachably mounted in the mount section 28 of the base housing 16 of the data processing equipment 10 shown in FIG. 1, in the same manner as the pointing device 18 of the first embodiment although the grooves as guide means are not shown for the pointing device 140. When the pointing device 140 is attached to the mount section 28 and is used as a built-in device, the operator can operate the ball-operation entering section 142 by directly rotating the ball 148 partially exposed on the top wall 172 of the casing 158 by a finger, in the same manner as the conventional built-in ball-operation pointing device. When the pointing device 140 is detached from the base housing 16 and is used as a separate device, the operator can operate the ball-operation entering section 142 by gripping the casing 158 with a hand and shifting the pointing device 140 on a stationary surface of, e.g., a desk in the desired direction, in the same manner as the conventional separate mouse. In both operation modes, the rotational angle and direction of the ball 148 are entered as analog information by the pointing device 140. The analog information entered through the ball-operation entering section 142 is converted to digital coordinate data in a CPU (not shown) and emitted from a light emitting element 184 mounted on a printed circuit board 182 as light signals of, e.g., infrared ray, in the same manner as the ball-operation entering section 46 of the pointing device 16 of FIG. 3.

As will be understood from the above, the pointing device 140 is more advantageous than the pointing device 18 of FIG. 1, on the point of the structure and manufacturing cost of the pointing device, because only one analog information entering section is provided. In addition, it is not necessary to set the pointing device 140 upside down when the operating mode is changed between the built-in mode and the separate mode in relation to the base housing 16 of the data processing equipment 10. Thus, it is possible to eliminate a matching circuit and a change-over switch, both required for avoiding the signal reversing problem in the conventional built-in mouse, and the pointing device 140 is allowed to be provided with the click switches 178 only on the top surface of the casing 158, so that the structures and control systems of both the processing equipment 10 and the pointing device 140 can be simplified. Also, since the pointing device 140 transmits data signals as light signals, troublesome cable handling is eliminated, which improves the operability of the pointing device 140 and the portability of the data processing equipment 10.

While the invention has been particularly shown and described with reference to preferred embodiments thereof, it will be understood by those skilled in the art that various changes and modifications may be made without departing from the spirit and scope of the following claims.

What is claimed is:

1. A data processing equipment comprising:
    a housing for a keyboard and a display;
    a pointing device detachably mounted in said housing for instructing said processing equipment on coordinate data by manually entering analog information;
        said pointing device including a light emitting section for emitting light signals representing the coordinate data;
        said housing including a first light receiving section for receiving the light signals emitted from said light emitting section when said pointing device is attached to said housing for operation, and a second light receiving section for receiving the light signals emitted from said light emitting section when said pointing device is detached from said housing for operation,
        said pointing device further including an analog information entering section which can be operated in two or more modes for different entering operations,
        said analog information entering section including a sheet-operation entering section in which a shifting direction and a shifting distance of a pushed position on a sheet member are entered, and a ball operation entering section in which a rotational direction and a rotational angle of a ball are entered.

2. A data processing equipment as defined in claim 1, further comprising an optical transmission line for transmitting the light signals received in one of said first and second light receiving sections to the other light receiving section.

3. A data processing equipment as defined in claim 1, further comprising a guide member for guiding said pointing device to a proper position in said housing.

4. A data processing equipment as defined in claim 1, further comprising a fastening mechanism for fastening said pointing device to a proper position in said housing.

5. A data processing equipment as defined in claim 1, wherein said sheet member is arranged in a casing of said pointing device to be exposed on a first wall of said casing, and wherein said ball is arranged in said casing to be partially exposed on a second wall of said casing opposed to said first wall.

6. A data processing equipment as defined in claim 1, further comprising a switching mechanism for switching functions of said analog information entering section so as to give said sheet-operation entering section priority in function when said pointing device is attached to said housing, and to give said ball-operation entering section priority in function when said pointing device is detached from said housing.

7. A data processing equipment as defined in claim 1, wherein said pointing device includes a processing section for converting analog information entered through said analog information entering section into digital coordinate data.

8. A pointing device comprising:
a casing detachably mounted in a data processing equipment;
an analog information entering section arranged in said casing and capable of being operated in two or more modes for different entering operations;
a processing section arranged in said casing in association with said analog information entering section to convert analog information into digital coordinate data; and
a light emitting section arranged in said casing in association with said processing section to emit light signals representing the digital coordinate data
wherein said analog information entering section includes a sheet-operation entering section in which a shifting direction and a shifting distance of a pushed position on a sheet member are entered, and a ball-operation entering section in which a rotational direction and a rotational angle of a ball are entered.

9. A pointing device as defined in claim 8, wherein said sheet member is arranged in said casing to be exposed on a first wall of said casing, and wherein said ball is arranged in said casing to be partially exposed on a second wall of said casing opposed to said first wall.

10. A pointing device as defined in claim 8, further comprising a switching mechanism for switching functions of said analog information entering section so as to give said sheet-operation entering section priority in function when said casing is attached to said data processing equipment, and to give said ball-operation entering section priority in function when said casing is detached from said data processing equipment.

11. A pointing device comprising:
a casing detachably mounted in a data processing equipment;
an analog information entering section arranged in said casing and capable of being operated in two or more modes for different entering operations;
a processing section arranged in said casing in association with said analog information entering section to convert analog information into digital coordinate data; and
a light emitting section arranged in said casing in association with said processing section to emit light signals representing the digital coordinate data
wherein said analog information entering section includes a ball-operation entering section in which a rotational direction and a rotational angle of the ball are entered, said ball being arranged in said casing to be partially exposed on two opposed walls of said casing.

12. A data processor comprising:
a coordinate data input device;
a first light receiving section for receiving light signals emitted from said coordinate data input device when said coordinate data input device is in a first position;
a second light receiving section for receiving light signals from said coordinate data input device when said coordinate data input device is in a second position; and
an optical transmission line for transmitting the light signals received in one of said first and second light receiving sections to the other light receiving section.

13. A data processing equipment comprising:
a housing for a keyboard and a display;
a pointing device detachably mounted in said housing for instructing said processing equipment on coordinate data by manually entering analog information;
said pointing device including a light emitting section for emitting light signals representing the coordinate data;
said housing including a first light receiving section for receiving the light signals emitted from said light emitting section when said pointing device is attached to said housing for operation, and a second light receiving section for receiving the light signals emitted from said light emitting section when said pointing device is detached from said housing for operation; and
an optical transmission line for transmitting the light signals received in one of said first and second light receiving sections to the other light receiving section.

14. A data processing equipment comprising:
a housing for a keyboard and a display;
a pointing device detachably mounted in said housing for instructing said processing equipment on coordinate data by manually entering analog information;
said pointing device including a light emitting section for emitting light signals representing the coordinate data;
said housing including a first light receiving section for receiving the light signals emitted from said light emitting section when said pointing device is attached to said housing for operation, and a second light receiving section for receiving the light signals emitted from said light emitting section when said pointing device is detached from said housing for operation,
said pointing device further including an analog information entering section which can be operated in two or more modes for different entering operations,
said analog information entering section including a ball-operation entering section in which a rotational direction and a rotational angle of a ball are entered, said ball being arranged in a casing of said pointing device to be partially exposed on two opposed walls of said casing.

15. A data processing equipment as defined in claim 14, further comprising an optical transmission line for transmitting the light signals received in one of said first and second light receiving sections to the other light receiving section.

16. A data processing equipment as defined in claim 14, further comprising a guide member for guiding said pointing device to a proper position in said housing.

17. A data processing equipment as defined in claim 14, further comprising a fastening mechanism for fastening said pointing device to a proper position in said housing.

18. A data processing equipment as defined in claim 14, wherein said pointing device includes a processing section for converting analog information entered through said analog information entering section into digital coordinate data.

19. A data processor comprising:
a coordinate data input device;
a first light receiving section for receiving light signals emitted from said coordinate data input device when said coordinate data input device is in a first position; and
a second light receiving section for receiving light signals from said coordinate data input device when said coordinate data input device is in a second position, said coordinate data input device including an analog information entering section which can be operated in two or more modes for different entering operations, said analog information entering section including a sheet-operation entering section in which a shifting direction and a shifting distance of a pushed position on a sheet member are entered, and a ball operation entering section in which a rotational direction and a rotational angle of a ball are entered.

20. A data processor comprising:

a coordinate data input device;

a first light receiving section for receiving light signals emitted from said coordinate data input device when said coordinate data input device is in a first position; and a second light receiving section for receiving light signals from said coordinate data input device when said coordinate data input device is in a second position, said coordinate data input device including an analog information entering section which can be operated in two or more modes for different entering operations, said analog information entering section including a ball-operation entering section in which a rotational direction and a rotational angle of a ball are entered, said ball being arranged in a casing of said coordinate data input device to be partially exposed on two opposed walls of said casing.

* * * * *